(12) United States Patent
Sane et al.

(10) Patent No.: US 9,392,527 B2
(45) Date of Patent: Jul. 12, 2016

(54) SYSTEM AND METHOD FOR EFFICIENT L3 MOBILITY IN A WIRED/WIRELESS NETWORK

(71) Applicant: DELL PRODUCTS L.P., Round Rock, TX (US)

(72) Inventors: Sanjay Sane, Fremont, CA (US); Snigdhendu S. Mukhopadhyay, San Jose, CA (US); Krishnamurthy Subramanian, Mountain View, CA (US); Wenjing Chu, Saratoga, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/675,550

(22) Filed: Mar. 31, 2015

(65) Prior Publication Data
US 2015/0208321 A1 Jul. 23, 2015

Related U.S. Application Data

(63) Continuation of application No. 13/909,917, filed on Jun. 4, 2013, now Pat. No. 8,995,398.

(51) Int. Cl.
| | |
|---|---|
| *H04W 80/04* | (2009.01) |
| *H04W 88/06* | (2009.01) |
| *H04W 72/04* | (2009.01) |
| *H04W 28/04* | (2009.01) |
| *H04W 36/18* | (2009.01) |
| *H04W 40/34* | (2009.01) |
| *H04W 36/00* | (2009.01) |
| *H04L 29/12* | (2006.01) |
| *H04W 28/02* | (2009.01) |
| *H04W 88/00* | (2009.01) |

(52) U.S. Cl.
CPC ........... *H04W 40/34* (2013.01); *H04L 61/6022* (2013.01); *H04W 28/0226* (2013.01); *H04W 36/0055* (2013.01); *H04W 36/0011* (2013.01); *H04W 88/005* (2013.01)

(58) Field of Classification Search
CPC ..... H04W 80/04; H04W 88/06; H04W 28/04; H04W 72/04; H04W 36/18
USPC ......................................... 370/328, 329, 331
See application file for complete search history.

(56) References Cited

U.S. PATENT DOCUMENTS

| | | | | |
|---|---|---|---|---|
| 2006/0256749 | A1* | 11/2006 | Rexhepi et al. | ................ 370/329 |
| 2008/0025275 | A1 | 1/2008 | Cheng et al. | |
| 2008/0165705 | A1 | 7/2008 | Umayabashi et al. | |
| 2014/0321328 | A1* | 10/2014 | Zuniga | .................... H04W 8/06 370/254 |

* cited by examiner

*Primary Examiner* — Ronald B Abelson
(74) *Attorney, Agent, or Firm* — Haynes & Boone, LLP

(57) ABSTRACT

A system and method for efficiently handling mobility events includes detecting a mobility event associated with a movement of a mobile unit from a first subnet to a second subnet, forming one or more first flow control messages for updating routing information associated with the mobility event, transmitting the one or more first flow control messages to a core router, forming one or more second flow control messages for disabling layer 2 learning, transmitting the one or more second flow control messages to one or more network switching devices in the first subnet, forming one or more third flow control messages including layer 2 switching instructions for directing network traffic to the mobile unit in the second subnet, and transmitting the one or more third flow control messages.

19 Claims, 5 Drawing Sheets

SYSTEM AND METHOD FOR EFFICIENT L3 MOBILITY IN A WIRED/WIRELESS NETWORK

CROSS REFERENCE TO RELATED APPLICATIONS

This application is a continuation of U.S. patent application Ser. No. 13/909,917 filed on Jun. 4, 2013, the full disclosure of which is incorporated by reference herein in its entirety and for all purposes.

BACKGROUND

The present disclosure relates generally to information handling systems, and more particularly to efficient Layer 3 (L3) mobility in a wired/wireless network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. The forwarding decisions may be further complicated by use of these networks by mobile devices, each having different types and amounts of data that needs to be transferred as network traffic.

Networks are hierarchical and often divided into different subnets. A subnet is a subdivision of a Layer 3 network, for example an IP network that often terminates within each building, sometimes within each access layer. One subnet may not span across all wireless access points in different subnets. Enterprise networks often see a large percentage of mobile units with mobile devices. These mobile devices are often called Bring Your Own Devices (BYODs). BYODs are coupled to the wireless access points, and as the BYOD moves from one wireless access point in one subnet to another wireless access point in a different subnet, the network should efficiently handle these mobility events.

It would be desirable to provide a method and a system to efficiently handle mobility events.

SUMMARY

According to one embodiment, a method of managing a network includes detecting a mobility event associated with a movement of a mobile unit from a first subnet to a second subnet, forming one or more first flow control messages for updating routing information associated with the mobility event, transmitting the one or more first flow control messages to a core router, forming one or more second flow control messages for disabling layer 2 learning, transmitting the one or more second flow control messages to one or more network switching devices in the first subnet, forming one or more third flow control messages including layer 2 switching instructions for directing network traffic to the mobile unit in the second subnet, and transmitting the one or more third flow control messages.

According to another embodiment, a network controller includes a control unit and one or more ports coupled to the control unit. The network controller is configured to detect a mobility event associated with a movement of a mobile unit from a first subnet to a second subnet, form one or more first flow control messages for updating routing information associated with the mobility event, transmit the one or more first flow control messages on the one or more ports to a core router, form one or more second flow control messages for disabling layer 2 learning, transmit the one or more second flow control messages on the one or more ports to one or more network switching devices in the first subnet, form one or more third flow control messages including layer 2 switching instructions for directing network traffic to the mobile unit in the second subnet, and transmit the one or more third flow control messages on the one or more ports.

According to yet another embodiment, an information handling system includes a core router, first and second subnets, and a network controller including a control unit and one or more ports coupled to the control unit. The network controller is configured to detect a mobility event associated with a movement of a mobile unit from a first subnet to a second subnet, form one or more first flow control messages for updating routing information associated with the mobility event, transmit the one or more first flow control messages on the one or more ports to a core router, form one or more second flow control messages for disabling layer 2 learning, transmit the one or more second flow control messages on the one or more ports to one or more network switching devices in the first subnet, form one or more third flow control messages including layer 2 switching instructions for directing network traffic to the mobile unit in the second subnet, and transmit the one or more third flow control messages on the one or more ports.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a Personal Digital Assistant (PDA), a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
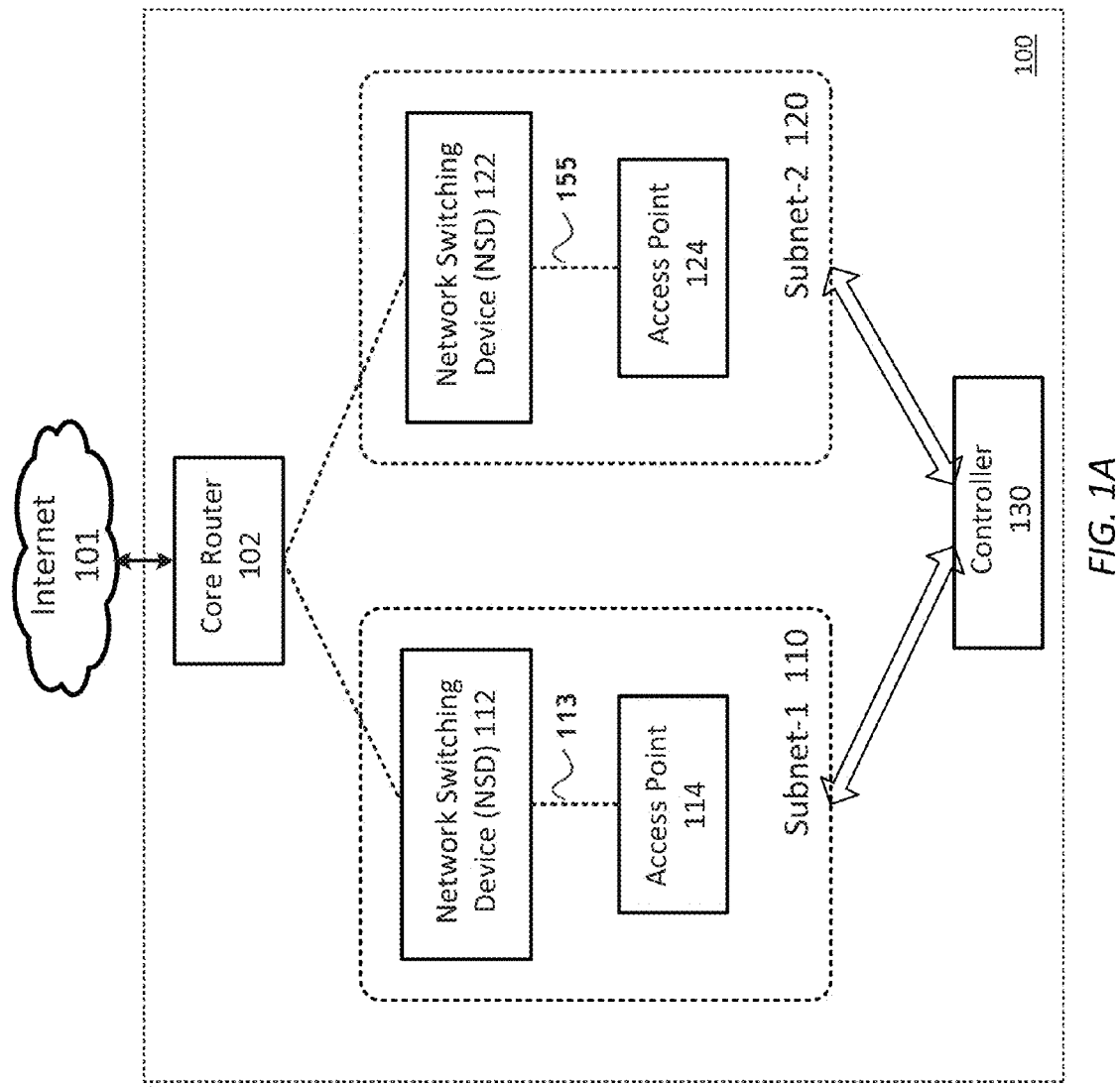
FIG. 1A is a simplified diagram of an autonomous system according to some embodiments.

FIG. 1A is a simplified diagram of an autonomous system 100 according to some embodiments. The autonomous system 100 includes a core router 102. In some examples, core router 102 may couple autonomous system 100 to internet 101. Autonomous system 100 may include one or more subnets. In some examples, core router 102 is coupled to a Subnet-1 110 in autonomous system 100. In some examples, core router 102 is further coupled to Subnet-2 120 in autonomous system 100. In some examples, core router 102 may be configured to route data packets to a destined subnet. In general, data packets sent from internet 101 includes address information. In some examples, the address information includes a destination IP address. Core router 202 may include routing information, such as routing data structure and/or routing policy. In some examples, core router 202 may read the address information in the data packet, and uses the routing information in the router to route the data packet to the subnet where it is destined. In some embodiment, autonomous system 100 may include more than one core router. In some examples, autonomous system 100 may include a collection of routing devices. In some examples, autonomous system 100 may include a level 3 cloud. In some examples, the autonomous system may be used for local and/or semi-local management of network switching devices.

In some embodiments, Subnet-1 110 includes a network switching device (NSD) or a switch 112. Subnet-1 110 may also include an access point (AP) 114. In some embodiment, Subnet-2 120 includes a network switching device or a switch 122. Subnet-2 120 may also include an access point 124. In some embodiments, network switching device 112 includes a layer 2 network switching device, configured to forward data packets to and from access point 114. In some embodiments, network switching device 122 includes a layer 2 network switching device, configured to forward data packets to and from access point 124. For example, the layer 2 network switching device may be selected from an Ethernet switch, and/or an aggregation pair, etc.

In some examples, network switching device 112 includes a layer 3 network switching device, configured to handle the routing function of layer 3 Internet Protocol within Subnet-1 110. In some examples, network switching device 122 includes a layer 3 network switching device, configured to handle the routing function of layer 3 Internet Protocol within Subnet-2 120. The layer 3 network switching device, for example, is selected from a router, a managing server, and/or a network switching unit, etc.

In some other examples, each subnet in the autonomous system, (e.g., Subnet-1 110 and Subnet-2 120) may include one or more layer 3 network switching devices linked together. In some examples, the subnet may include one or more layer 2 network switching devices linked together. In some examples, one or more layer 3 network switching devices and one or more layer 2 network switching devices are linked together. In some examples, one or more access points (e.g., access point 114 and access point 124) are linked together. Although one network switching device and one access point are shown in a subnet in FIG. 1A, a person having ordinary skill in the art would be able to understand that each subnet may include any number of network switching devices and access points in any suitable topology. In one embodiment as illustrated in FIG. 1A, the autonomous system 100 further comprises a controller 130 coupled to access points 114 and 124. In some examples, controller 130 includes a wireless controller.

Figure 1B:
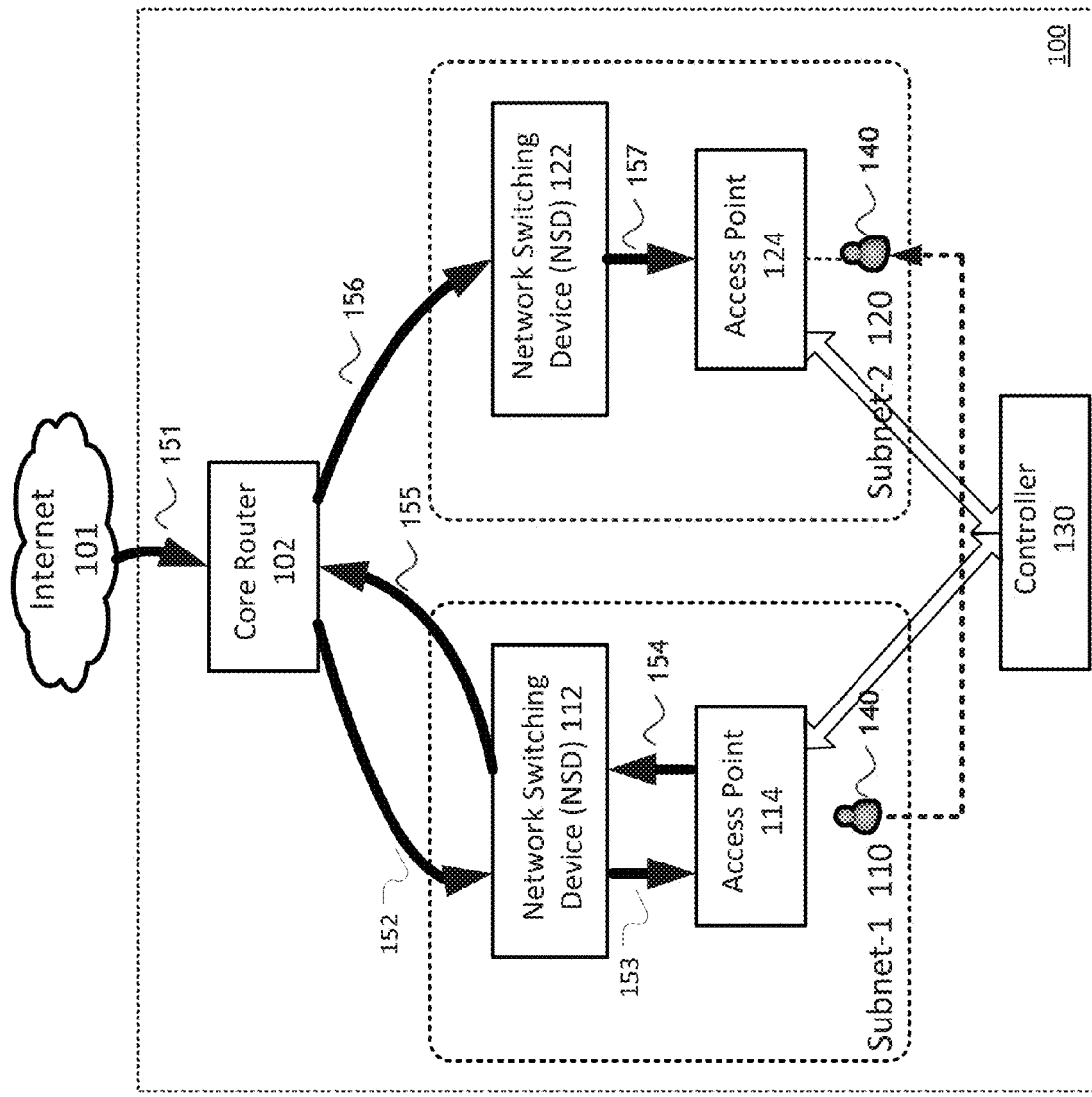
FIG. 1B is a simplified diagram showing the flow of the data packets in the autonomous system as shown of FIG. 1A according to some embodiments.

FIG. 1B is a simplified diagram showing the flow of the data packets in autonomous system 100 of FIG. 1A according to some embodiments. When a mobile unit moves from one subnet to a different subnet, the access point may detect and notify the controller of the new connection of the mobile unit. In an embodiment, the controller detects this change as a mobility event. In one example, a mobile unit 140 is originally coupled to access point 114 in Subnet-1 110. When mobile unit 140 moves to Subnet-2 120 and is coupled with access point 124, access point 124 may notify controller 130 of the mobility event. In some examples, controller 130 detects the mobility event. Controller 130 may then notify access point 114 in Subnet-1 of the mobility event.

In some examples, after the mobility event of mobile unit 140, in order to preserve any network sessions, for example TCP sessions without disruption, an IP address of mobile unit 140 from the original subnet (e.g., Subnet-1 110) may be preserved for mobile unit 140. In some examples, data packets destined to mobile unit 140 may be first delivered to the original subnet due to the mobile unit's preserved IP address. After the mobility event is detected, the data packets may then get routed from the original subnet to the subnet where mobile unit 140 has moved.

In some examples as illustrated in FIG. 1B, when a network device in internet 101 sends data packets destined to mobile unit 140 to autonomous system 100, the data packets may be received at core router 102 via path 151. Because the IP address of mobile unit 140 remains associated with Subnet-1 110, based on the routing information in core router 102, the data packets may be routed to network switching device 112 in Subnet-1 110 via path 152. In some examples, the data packets are then forwarded to access point 114 via path 153. Because controller 130 has detected and notified access point 114 of the mobility event of mobile unit 140, the data packets may be directed from access point 114 back to network switching device 112 via path 154. In some examples, the data packets are further sent back to core router 102 via path 155. In some examples, core router 102 then routes the data packets to network switching device 122 in Subnet-2 120 via path 156. Network switching device 122 may further forward the data packets to access point 124 via path 157. In some examples, paths 154, 155, 156 and 157 are accomplished using a tunnel and/or an encapsulation mechanism. Then the data packets may be delivered to mobile unit 140 from access point 124.

This data packets flow pattern, for example as indicated as paths 151-157 in FIG. 1B, may not be efficient. Tromboning or hairpinning, may occur to the flow of the data packets as long as the mobile unit retains the IP address of its original subnet. The tromboning or hairpinning flow pattern of the data packets may take up network bandwidth, and/or create more redundant routing paths. In some examples, with more users having their BYODs, there are a large number of mobile units creating multiple mobility events. The above mentioned data packets flow pattern may significantly slow down the wired/wireless enterprise networks.

Figure 2A:
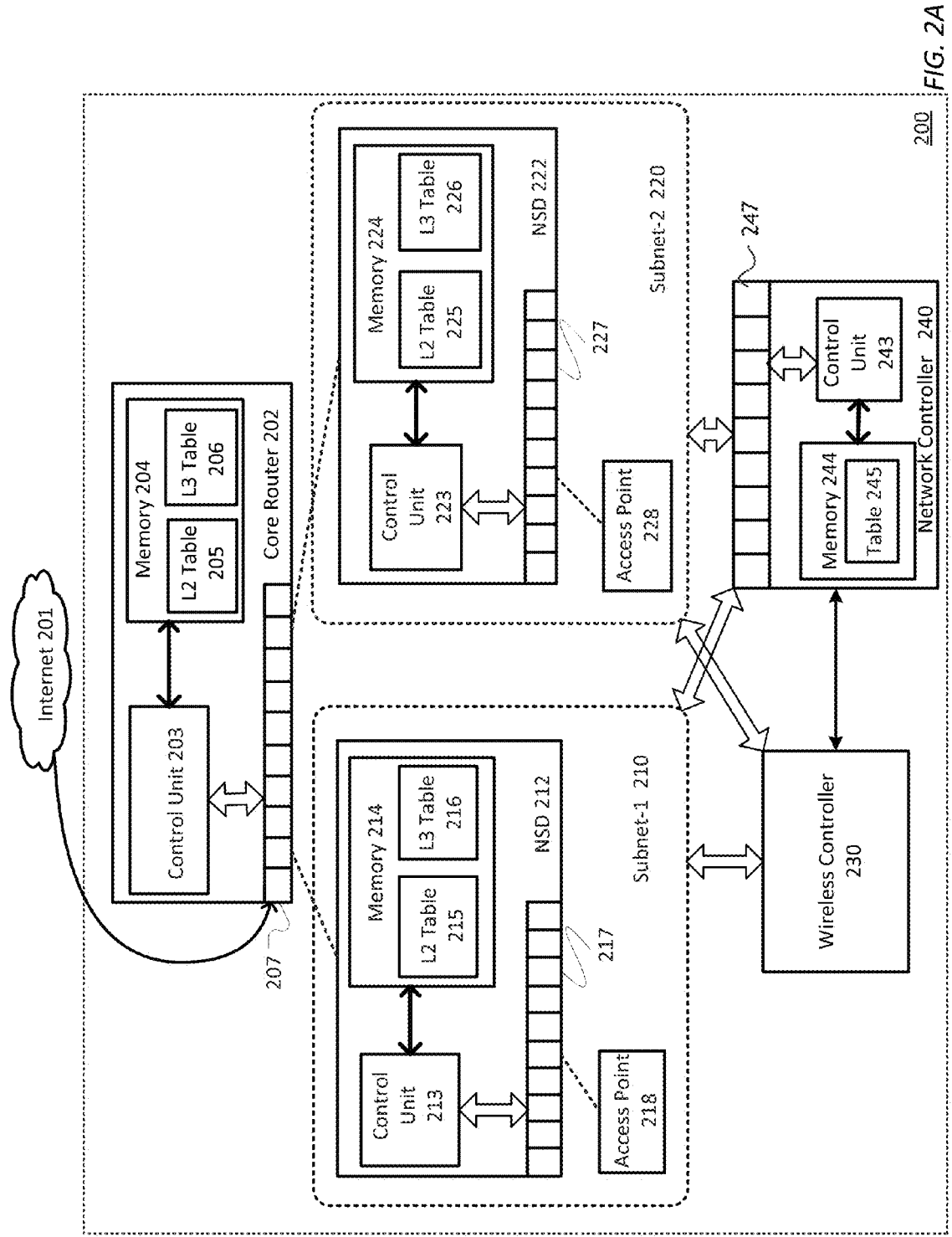
FIG. 2A is a simplified diagram of an autonomous system including a network controller according to some embodiments.

FIG. 2A is a simplified diagram of an autonomous system 200 according to some embodiments. The autonomous system 200 includes a core router 202 configured to route data packets to a destined subnet. Core router 202 may couple autonomous system 200 to internet 201. Autonomous system 200 may include one or more subnets coupled to core router 202. In some examples as illustrated in FIG. 2A, core router 202 includes one or more ports 207, for coupling core router 202 to Subnet-1 210 in autonomous system 200. One or more ports 207 may further couple core router 202 to Subnet-2 220. In some examples, core router 202 is core router 102. Core router 202 may also include a control unit 203. In some examples, control unit 203 is configured to manage and/or control the operation of core router 202. In some examples, control unit 203 may include one or more processors. Core router 202 also includes a memory 204. In some embodiments, control unit 203 is coupled to memory 204. In some examples, memory 204 may include a layer 2 (L2) table 205. L2 table 205 may be used by core router 202 and/or control unit 203 to store media access control (MAC) address information of the other network switching devices and/or related forwarding information. In some examples, memory 204 may further include a layer 3 (L3) table 206. L3 table 206 may be used by core router 202 and/or control unit 203 to store IP address information of the other network switching devices and/or routing information. In some examples, L2 table 205 and L3 table 206 are stored in memory 204. In some embodiments, autonomous system 200 may include more than one core router. In some examples, autonomous system 200 may include a collection of routing devices. In some examples, autonomous system 200 may include a level 3 cloud. In some examples, the autonomous system may be used for local and/or semi-local management of network switching devices.

In some embodiments, a subnet includes one or more network switching devices or switches. The core router 202 may be coupled to the one or more network switching devices via one or more ports 207 of the core router 202. For example core router 202 is coupled to network switching device 212 in Subnet-1 210 via ports 207. Core router 202 may be coupled to network switching device 222 in Subnet-2 220 via ports 207.

Network switching device 212 may include one or more ports 217 that couple network switching device 212 to core router 202 for transmitting and receiving data packets. In some examples, network switching device 212 is network switching device 112. In some examples, Subnet-1 210 also includes an access point (AP) 218 coupled to network switching device 212 via ports 217. Access point 218 may be wirelessly coupled to one or more mobile devices in Subnet-1 210. In some examples, access point 218 is access point 114. Similarly network switching device 222 may include one or more ports 227 that couple network switching device 222 to core router 202 for transmitting and receiving data packets. In some examples, network switching device 222 is network switching device 122. In some examples, Subnet-2 220 includes an access point 228 coupled to network switching device 222 via ports 227. Access point 228 may be wirelessly coupled to one or more mobile devices in Subnet-2 220. In some examples, access point 228 is access point 124.

In some examples, network switching device 212 includes a layer 2 network switching device, configured to forward data packets to and from access point 218. In some examples, network switching device 222 includes a layer 2 network switching device, configured to forward data packets to and from access point 228. For example, the layer 2 network switching device may be selected from an Ethernet switch, and/or an aggregation pair, etc.

In some examples, network switching device 212 includes a layer 3 network switching device, configured to handle the routing function of layer 3 Internet Protocol within Subnet-1 210. In some examples, networks switching device 222 includes a layer 3 networks switching device, configured to handle the routing function of layer 3 Internet Protocol within Subnet-2 220. The layer 3 network switching device, for example, is selected from a router, a managing server, and/or a network switching unit, etc.

In some examples, the subnet in the autonomous system may include one or more layer 3 network switching devices linked together. In some examples, the subnet may include one or more layer 2 network switching devices linked together. In some examples, one or more layer 3 network switching devices and one or more layer 2 network switching devices are linked together. In some examples, one or more access points are linked together. Although one network switching device and one access point are shown in a subnet in FIG. 2A, a person having ordinary skill in the art would be able to understand that each subnet may include any number of network switching devices and access points in any suitable topology.

Network switching device 212 may include a control unit 213 and/or memory 214. In some examples, control unit 213 may manage and/or control the operation of network switching device 212. In some examples, control unit 213 may include one or more processors. In some examples, control unit 213 may maintain and/or update the one or more forwarding information tables (for example, L2 table 215 and L3 table 216) in memory 214. In some examples, the one or more forwarding information tables may be stored in memory 214 coupled to control unit 213 and/or network switching device 212. In some examples, the one or more forwarding information tables may include virtual LAN (VLAN) tables, MAC tables/L2 tables, L3 tables, layer 3 forwarding information bases, access control lists (ACLs), flow processing (FP) tables, and/or the like. In some examples, the one or more forwarding information tables may be implemented using data structures other than tables and/or using databases. Similarly, network switching device 222 includes a control unit 223 and/or memory 224. Memory 224 may include one or more forwarding information tables (for example, L2 table 225 and L3 table 226 as shown in FIG. 2A).

In some embodiments, autonomous system 200 includes a network controller 240. As shown in FIG. 2A, network controller 240 includes one or more ports 247, for coupling network controller 240 to one or more network switching devices (for example, network switching devices 212 and/or 222). One or more ports 247 may also couple network controller 240 to one or more network devices (for example, core router 202) for transmitting and receiving management packets. Network controller 240 may include control unit 243. In some examples, control unit 243 may manage and/or control the operation of network controller 240. In some examples, control unit 243 may include one or more processors. In some examples, network controller 240 is operating as a managing controller for autonomous system 200. Thus, network controller 240 may include management table 245 stored in memory 244 coupled to network controller 240 and/or control unit 243. In some examples, management table 245 may be used by network controller 240 and/or control unit 243 to store information regarding the configuration of other devices in autonomous system 200. In some examples, management table 245 may include one or more tables.

In some embodiments, autonomous system 200 includes wireless controller 230. In some examples, wireless controller 230 is wireless controller 130. In some examples, network controller 240 may include one or more Application Programming Interfaces (APIs) configured to facilitate communication between network controller 240 and wireless controller 230. In some embodiments, network controller 240 is coupled to network switching devices 212 and/or 222 via one or more ports 247, and the one or more APIs may facilitate communication between the network controller and the other network switching devices. In some examples, network controller 240 is coupled to core router 202 via one or more ports 247, and the one or more APIs may facilitate communication between network controller 240 and core router 202. In some examples, wireless controller 230 may be coupled to access point 218 through network switching device 212. Wireless controller 230 may be coupled to access point 218 through network switching device 212 and/or core router 202. Wireless controller 230 may be coupled to access point 218 through other devices not shown in FIG. 2A. Wireless controller 230 may be further coupled to access point 228. Although wireless controller 230 and network controller 240 are illustrated separately in FIG. 2A, a person having ordinary skill in the art would be able to understand that in any suitable topology, the wireless controller and the network controller may be replaced with a unified wireless/wired controller. In some examples, core router 202, networks switching devices 212 and 222, access points 218 and 228, wireless controller 230 and network controller 240 may be in the same management and control domain.

Figure 2B:
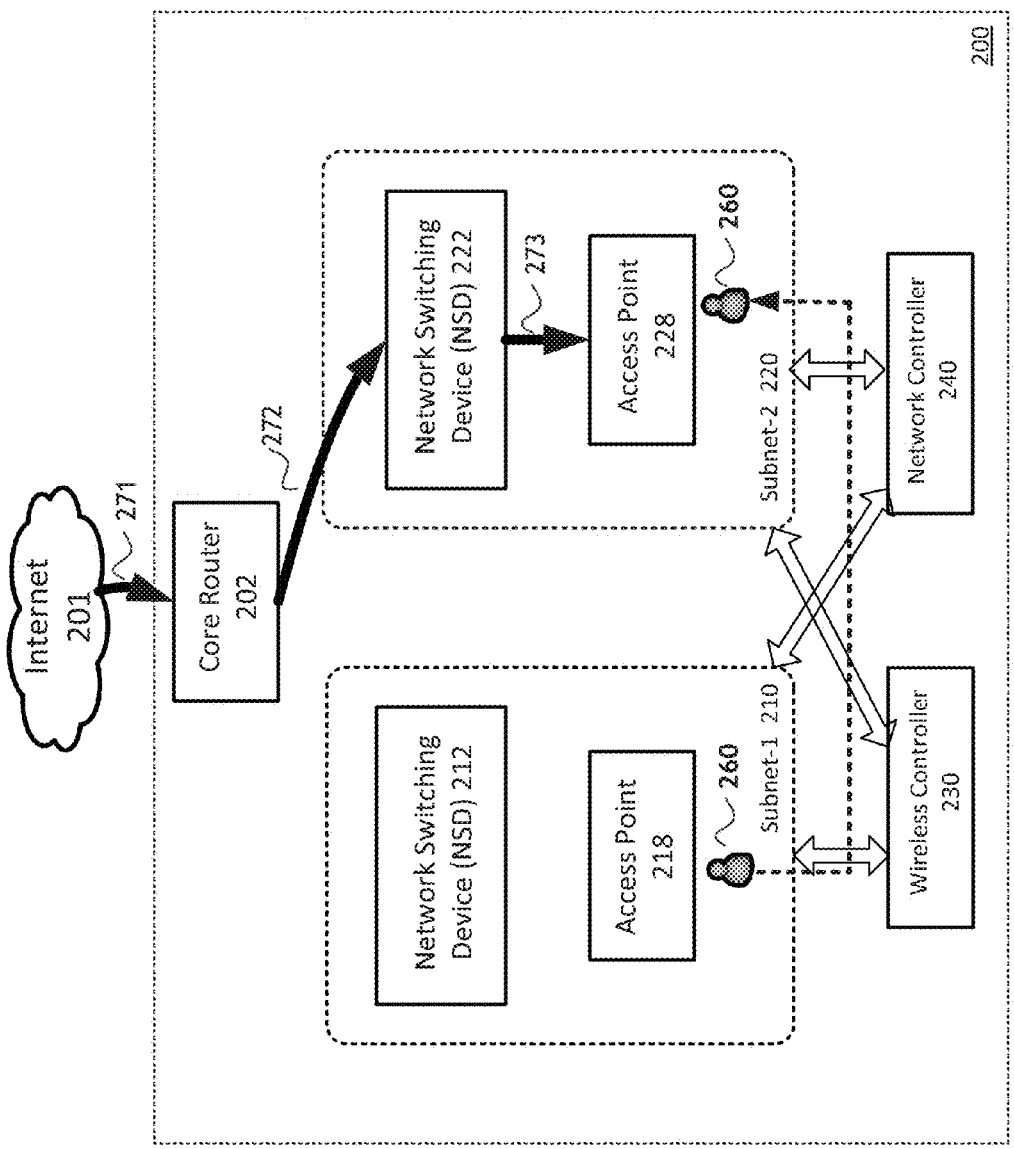
FIG. 2B is a simplified diagram showing the flow of the data packets in the autonomous system including a network controller as shown in FIG. 2A according to some embodiments.

FIG. 2B is a simplified diagram showing the flow of data packets in autonomous system 200 of FIG. 2A according to some embodiments. In some examples as shown in FIG. 2B, mobile unit 260 is originally coupled to access point 218 in Subnet-1 210. When mobile unit 260 moves to Subnet-2 220 and is coupled to access point 228, access point 228 may notify wireless controller 230 of the mobility event. In some examples, wireless controller 230 detects the mobility event. Wireless controller 230 may communicate with network controller 240 of the mobility event through APIs. In some examples, network controller 240 detects the mobility event. The IP address of mobile unit 260 from the original subnet may be preserved without refreshing or changing after the L3 mobility event.

In some embodiments, after detecting the mobility event, control unit 243 in network controller 240 creates one or more flow control messages to update layer 3 routing information in core router 202. In some examples, the layer 3 routing information includes IP routing information. In some examples, control unit 243 transmits the flow control messages on one or more ports 247 to core router 202. In some examples, control unit 203 inserts IP routing information of mobile unit 260 to core router 202. Control unit 203 may insert the IP routing information into L3 table 206 stored in the memory 204. In some examples, the IP routing information includes a /32 IP routing entry for the IP address of mobile unit 260. In some examples, the /32 IP routing entry may have higher priority than the subnet routing information, so that this /32 IP routing entry may override the default layer 3 routing information that would normally forward data packets for mobile unit 260 to Subnet-1 210 as described in FIG. 1B.

In some embodiments, control unit 243 of network controller 240 further creates one or more flow control messages to disable layer 2 learning in Subnet-1 210. In some examples, the layer 2 learning includes MAC learning. In some examples, the layer 2 learning includes Address Resolution Protocol (ARP) learning in Subnet-1 210. The flow control messages are then transmitted by control unit 243 on one or more ports 247 to one or more ports 217 of network switching device 212 in Subnet-1 210. In some examples, control unit 213 turns off the MAC and/or ARP learning in Subnet-1 210 by network switching device 212.

In some embodiments, control unit 243 in network controller 240 creates one or more flow control messages to update layer 2 switching instructions associated with the mobility event in core router 202. In some embodiments, the layer 2 switching instructions include a MAC address of mobile unit 260 in Subnet-2 220. In some embodiments, the layer 2 switching instructions include instructions for forwarding layer 2 traffic to mobile unit 260 using Subnet-2 220. Control unit 243 of network controller 240 may transmit the flow control messages on one or more ports 247 to core router 202. In some examples, the one or more flow control messages include a static MAC address entry into core router 202. In some embodiments, control unit 203 may insert the MAC address of mobile unit 260 into L2 table 205 stored in memory 204, so that layer 2 traffic may be directed to mobile unit 260 in Subnet-2 220 through network switching device 222. Thus the data packets destined to mobile unit 260 may be routed to Subnet-2 after the mobility event.

In some embodiments, control unit 243 in network controller 240 also creates one or more flow control messages to update layer 2 switching instructions in network switching device 212 and/or other network switching devices in Subnet-1 210. In some embodiments, the layer 2 switching instructions include MAC address of mobile unit 260 in Subnet-2 220. In some embodiments, the layer 2 switching instructions include instructions for forwarding layer 2 traffic to mobile unit 260 via Subnet-2 220. Control unit 243 of network controller 240 may transmit the flow control messages on one or more ports 247 to network switching device 212 and/or other network switching devices in Subnet-1 210. In some examples, the one or more flow control messages include a static MAC address entry into network switching device 212 and/or other network switching devices in Subnet-1 210. In some embodiments, control unit 213 may insert the MAC address of mobile unit 260 into L2 table 215 stored in the memory 214, so that layer 2 traffic is directed to mobile unit 260 through network switching device 222.

In some examples as illustrated in FIG. 2B, when internet 201 sends data packets destined to the mobile unit 260 to autonomous system 200, the data packets may be received at core router 202 via path 271. The data packets may be then routed to network switching device 222 in Subnet-2 220 via path 272. The data packets may be forwarded to access point 228 via path 273, and delivered to mobile unit 260 coupled to access point 228.

This data packets flow pattern, for example as indicated as paths 271-273 in FIG. 2B, may be more efficient because the tromboning or hairpinning flow pattern of the data packets can be avoided. Data packets may be routed and forwarded without taking up extra bandwidths or creating redundant routing paths. The data packets flow pattern disclosed herewith may be beneficial for the wired/wireless enterprise networks with large numbers of mobile units and mobile events.

Figure 3:
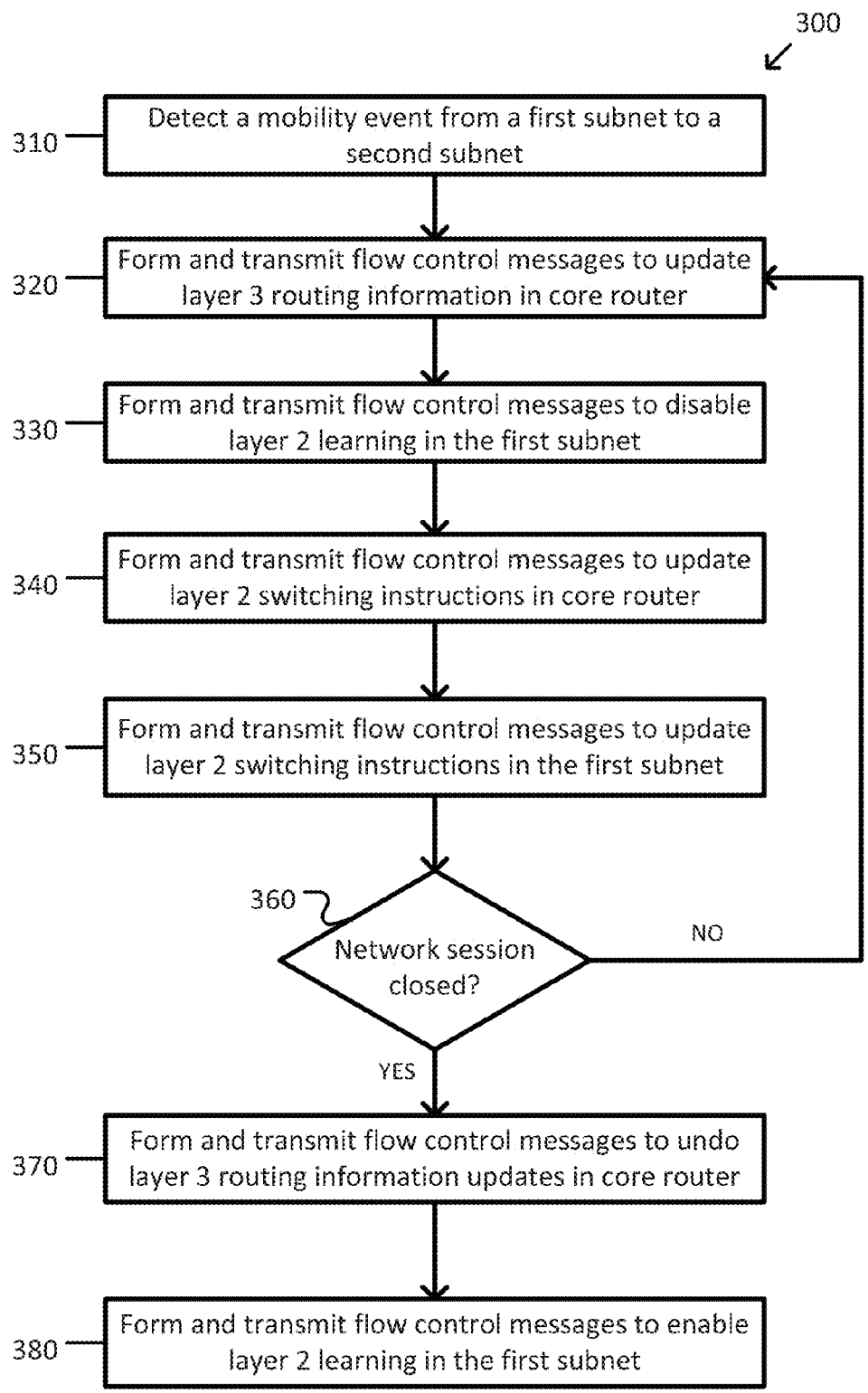
FIG. 3 is a simplified diagram showing a method of managing network connection after a mobility event using an autonomous system according to some embodiments.

FIG. 3 is a simplified diagram showing a method 300 of managing a network according to some embodiments. As shown in FIG. 3, method 300 includes a process 310 for detecting a mobility event from a first subnet to a second subnet, a process 320 for forming and transmitting flow control messages to update layer 3 routing information in a core router, a process 330 for forming and transmitting flow control messages to disable layer 2 learning in the first subnet, a process 340 for forming and transmitting flow control messages to update layer 2 switching instructions in the core router, a process 350 for forming and transmitting flow control messages to update layer 2 switching instructions in the first subnet, a process 360 for determining if all network sessions associated with an IP address of the mobile unit from the first subnet are closed, a process 370 for forming and transmitting flow control messages to undo updating layer 3 routing information in the core router, and a process 380 for forming and transmitting flow control messages to enable layer 2 learning in the first subnet. According to certain embodiments, method 300 of mobility event management can be performed using variations among processes 310-380 as would be recognized by one of ordinary skill in the art. In some embodiments, one or more of processes 360-380 are optional and may be omitted. In some embodiments, one or more of processes 310-380 of method 300 may be implemented, at least in part, in the form of executable code stored on non-transient, tangible, machine readable media that when run by one or more processors (for example, one or more processors in network controller 240) may cause the one or more processors to perform one or more of processes 310-380.

At process 310, a mobility event is detected. A mobility event may include a mobile unit, such as mobile unit 260, moving from a first subnet (e.g., Subnet-1 210) to a different second subnet (e.g., Subnet-2 220). A network device, such as an access point 228, may find a new connection from mobile unit 260 in Subnet-2 220. Access point 228 may notify a network controller 240 of the mobility event. In some examples, access point 228 may notify a wireless controller 230 of the mobility event. Wireless controller 230 may further notify network controller 240 of the mobility event. In some examples, wireless controller 230 may notify network controller 240 using one or more APIs of network controller 240. In some examples, network controller 240 detects the mobility event.

At process 320, one or more flow control messages are formed and transmitted to update layer 3 routing information in the core router (e.g., core router 202). The flow control messages may be formed and transmitted by network controller 240. The flow control messages include instructions to update the layer 3 routing information in core router 202. The routing information may be associated with the location of mobile unit 260 in Subnet-2 220. In some examples, the layer 3 routing information may include a /32 IP address routing entry based on an IP address of mobile unit 260. In some examples, control unit 203 of core router 202 may update one or more tables having routing information in core router 202.

At process 330, one or more flow control messages are formed and transmitted to disable layer 2 learning in the first subnet Subnet-1 210. The flow control messages may be formed and transmitted by network controller 240. The flow control messages may be transmitted to one or more selected network switching devices (e.g., network switching device 212) in Subnet-1 210. In some examples, the instructions to disable layer 2 learning may include instructions to disable MAC and/or ARP learning in Subnet-1 210.

At process 340, one or more flow control messages are formed and transmitted to update layer 2 switching instructions in core router 202. In some embodiments, the layer 2 switching instructions include instructions to insert the MAC address of mobile unit 260 in the second subnet Subnet-2 220 to core router 202. In some examples, the one or more flow control messages include a static MAC address entry into core router 202. The flow control messages are formed to direct layer 2 traffic for mobile unit 206 to Subnet-2 220.

At process 350, one or more flow control messages are formed and transmitted to update layer 2 switching instructions in the first subnet Subnet-1 210. In some embodiments, the layer 2 switching instructions include instructions to insert the MAC address of mobile unit 260 in the second subnet Subnet-2 220 to the network switching device and/or other network switching devices in the first subnet Subnet-1 210. In some examples, the one or more flow control messages include a static MAC address entry into the network switching device and/or other network switching devices in Subnet-1 210. The flow control messages are formed to direct layer 2 traffic for mobile unit 260 to Subnet-2 220.

At optional process 360, it is determined whether all network sessions (e.g., TCP and/or UDP sessions) associated with the IP address of mobile unit 260 from the first subnet Subnet-1 210 are closed. In some examples, network controller 240 determines whether the related network sessions are closed. In some examples, network controller 240 may actively exchange messages with one or more routers in the autonomous system. In some examples, network controller 240 may actively exchange messages with one or more network switching devices in the autonomous system. When all network sessions associated with the IP address of mobile unit 260 from Subnet-1 210 are closed, method 300 may proceed to the process 370. In some examples, when not all network sessions associated with the IP address of mobile unit 260 from Subnet-1 210 are closed, method 300 continues to process 320.

At optional process 370, one or more flow control messages are formed and transmitted to undo the layer 3 routing information updates in core router 202. One or more flow control messages are formed and transmitted to undo the layer 3 routing updates made during process 320. In some examples, the flow control messages include instructions to remove a /32 IP address routing entry performed during process 320. The flow control messages may be formed and transmitted by network controller 240. In some examples, a new IP address associated with the second subnet is assigned to mobile unit 260.

At optional process 380, one or more flow control messages are formed and transmitted to enable layer 2 learning in the first subnet Subnet-1 210. In some examples, this undoes the layer 2 learning disabled during process 330. The flow control messages may be formed and transmitted by network controller 240. The flow control messages may be transmitted to one or more selected network switching devices (e.g., network switching device 212) in Subnet-1 210. In some examples, the instructions to enable layer 2 learning may include instructions to enable MAC and/or ARP learning in Subnet-1 210.

Some embodiments of network controller 240 of FIG. 2A may include non-transient, tangible, machine readable media that include executable code that when run by one or more processors may cause the one or more processors to perform the processes of methods 300 as described above. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, the figure of the network controller is merely an example, which should not unduly limit the scope of the claims. One of ordinary skill in the art would recognize many variations, alternatives, and modifications. According to some embodiments, other architectures are possible for the network controller.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing a network, the method comprising:
    detecting a mobility event associated with a movement of a mobile device from a first subnet to a second subnet;
    transmitting a first message to a router coupled between the first and second subnets, the first message including updated routing information associated with the mobile device;
    transmitting a second message, the second message including updated switching information associated with the mobile device; and
    transmitting a third message to a switch in the first subnet to disable layer 2 learning.

2. The method of claim 1, wherein transmitting the second message includes transmitting the second message to the router.

3. The method of claim 1, wherein transmitting the second message includes transmitting the second message to a switch in the first subnet.

4. The method of claim 1, wherein the updated routing information includes a /32 IP routing table entry.

5. The method of claim 1, wherein the updated switching information includes a media access control (MAC) address of the mobile unit.

6. The method of claim 1, wherein the updated switching information includes a static MAC address entry.

7. The method of claim 1, wherein detecting the mobility event includes receiving a notification from a wireless controller.

8. The method of claim 1, wherein detecting the mobility event includes receiving a notification from an access point in the second subnet.

9. The method of claim 1, wherein the layer 2 learning includes MAC learning.

10. The method of claim 1, wherein the layer 2 learning includes Address Resolution Protocol (ARP) learning.

11. The method of claim 1, wherein the mobile device is assigned an IP address associated with the first subnet, and
    wherein the updated routing information includes a /32 IP routing entry for the IP address.

12. The method of claim 11, further comprising:
    determining whether all network sessions associated with the IP address are closed,
    when all the network sessions associated with the IP address are closed:
        transmitting a fourth message to the router to remove the /32 IP routing entry in the router; and
        transmitting a fifth message to the switch to enable layer 2 learning.

13. A network controller comprising:
    a control unit; and
    one or more ports coupled to the control unit,
    wherein the network controller is configured to:
        detect a mobility event associated with a movement of a mobile device from a first subnet to a second subnet;
        transmit a first message to a router coupled between the first and second subnets, the first message including updated routing information associated with the mobile device;
        transmit a second message, the second message including updated switching information associated with the mobile device; and
        transmit a third message to a switch in the first subnet to disable layer 2 learning.

14. The network controller of claim 13, wherein the network controller transmits the second message to the router.

15. The network controller of claim 13, wherein the network controller transmits the second message to the switch in the first subnet.

16. The network controller of claim 13, wherein:
    the mobile device is assigned an IP address associated with the first subnet,
    the updated routing information includes a /32 IP routing entry for the IP address, and
    the network controller is further configured to:
        determine whether all network sessions associated with the IP address are closed; and
        when all the network sessions associated with the IP address are closed:
            transmit a fourth message to the router to remove the /32 IP routing entry in the router; and
            transmit a fifth message to the switch to enable the layer 2 learning.

17. The network controller of claim 13, wherein the layer 2 learning is selected from a group consisting of MAC learning and ARP learning.

18. An information handling system comprising:
first and second subnets;
a router coupled between the first and second subnets; and
a network controller including a control unit and one or more ports coupled to the control unit,
wherein the network controller is configured to:
    detect a mobility event associated with a movement of a mobile device from the first subnet to the second subnet;
    transmit a first message to the router coupled between the first and second subnets, the first message including updated routing information associated with the mobile device;
    transmit a second message, the second message including updated switching information associated with the mobile device; and
    transmit a third message to a switch in the first subnet to disable layer 2 learning.

19. The information handling system of claim 18, wherein:
the mobile device is assigned an IP address associated with the first subnet,
the one or more first flow control messages include a /32 IP routing entry for the IP address, and
the network controller is further configured to:
    determine whether all network sessions associated with the IP address are closed; and
    when all the network sessions associated with the IP address are closed:
    transmit a fourth message to the router to remove the /32 IP routing entry in the router; and
    transmit a fifth message to the switch to enable the layer 2 learning.

* * * * *